(12) United States Patent
Zhou et al.

(10) Patent No.: US 7,695,557 B2
(45) Date of Patent: Apr. 13, 2010

(54) EFFICIENT COALESCING AGENTS

(75) Inventors: Lichang Zhou, Lawrenceville, NJ (US); Derek Pakenham, Hamilton, NJ (US); Jose Ruiz, Burlington, NJ (US); Pu Chen, Hillington Green (SG); Charles Aymes, Monmouth Junction, NJ (US); Keri Veres, Matawan, NJ (US); Bernard Koltisko, Milton, DE (US)

(73) Assignee: Rhodia inc., Cranbury, NJ (US)

( * ) Notice: Subject to any disclaimer, the term of this patent is extended or adjusted under 35 U.S.C. 154(b) by 0 days.

(21) Appl. No.: 12/363,287

(22) Filed: Jan. 30, 2009

(65) Prior Publication Data

US 2009/0194003 A1 Aug. 6, 2009

Related U.S. Application Data (60) Provisional application No. 61/025,065, filed on Jan. 31, 2008, provisional application No. 61/201,852, filed on Dec. 16, 2008.

(51) Int. Cl.
*C09D 7/12* (2006.01)
*C09D 11/00* (2006.01)

(52) U.S. Cl. ............... 106/287.24; 106/31.25; 106/31.13; 106/505; 560/190; 560/204

(58) Field of Classification Search ............ 106/287.24, 106/505; 560/190, 204
See application file for complete search history.

(56) References Cited

U.S. PATENT DOCUMENTS

| | | | | |
|---|---|---|---|---|
| 4,259,520 A | * | 3/1981 | Kummer et al. | 560/204 |
| 4,788,334 A | * | 11/1988 | Burke | 562/522 |
| 4,946,029 A | * | 8/1990 | Frank et al. | 203/29 |
| 6,368,777 B1 | * | 4/2002 | Obuchowicz | 430/331 |
| 2009/0149557 A1 | * | 6/2009 | Talingting-Pabalan et al. | 516/182 |

FOREIGN PATENT DOCUMENTS

WO  WO 2005/090501  9/2005

OTHER PUBLICATIONS

Randall, David; Chemoxy International, pp. 1-7; published by Chemoxy International, (Jun. 1, 1998).

* cited by examiner

*Primary Examiner*—David M Brunsman (57) ABSTRACT

A coalescent composition for coating compositions such as paints, adhesives, and coatings comprising a blend of diesters, the blend comprising adducts of alcohol and diacids, the alcohol selected from the group consisting of ethyl, propyl, isopropyl alcohol and mixtures thereof, and the diacids selected from the group consisting of a blend of adipic, glutaric and succinic diacids ("AGS") and a blend of adipic, methylglutaric, and ethylsuccinic diacids ("MGA"), and paint, adhesive, and coating compositions comprising such coalescent compositions are disclosed.

2 Claims, 10 Drawing Sheets

Fig. 1

Formulation of Semi-Gloss Paint Used for Evaluation

| | Lbs. per 100 Gallons |
|---|---|
| Ti-Pure R-746 | 362 |
| *Premix the following and add to letdown* | |
| Propylene glycol | 25.8 |
| Tamol 165 | 6.6 |
| Kathon LX 1.5% | 1.7 |
| *Continue with letdown* | |
| Rhoplex SG 20 | 525 |
| Aqueous ammonia (28%) | 2 |
| Acrysol RM 2020NPR | 19.4 |
| Acrysol RM 8W | 1.7 |
| Triton GR 7M | 2.1 |
| Foamaster VL | 2.2 |
| Water | 93.7 |
| Coalescing agent used – Benchmark or DEE | 11.9 |

Paint Performance Summary

| Coalescent Agents | Benchmark | DEE | DEE/M |
|---|---|---|---|
| Coalescent Level, lbs. / 100 Gallons | 11.9 | 11.9 | 11.9 |
| Viscosity, KU | 96 | 91 | 93 |
| Viscosity, KU (freeze/thaw-3 cycles) | 100 | 100 | 101 |
| Gloss 60 Degrees | 46.3 | 75.9 | 74.8 |
| Scrub Resistance, ASTM D2486 | 377 | 472 | 478 |
| Flow & Leveling, ASTM D4062 | 9 | 9 | 9 |
| Adhesion, 24 Hours Dry (Wet/Dry) | 4/5 | 4/5 | 4/5 |
| Blisters, 24 Hours Dry (10=best) | 10 | 10 | 10 |
| Block resistance, 1 day (RT) | 8 | 8 | 8 |
| Block resistance, 7 days (RT) | 9 | 9 | 10 |

Improved gloss and scrub at equal level

EFFICIENT COALESCING AGENTS

CROSS REFERENCE TO RELATED APPLICATIONS

This application claims the benefit of U.S. Provisional Application Ser. No. 61/025,065, filed Jan. 31, 2008 and U.S. Provisional Application Ser. No. 61/201,852, filed Dec. 16, 2008, all herein incorporated by reference.

FIELD OF THE INVENTION

This invention relates to the field of coalescing agents and, in particular, coalescing agents utilized in coating compositions, and related methods for use and preparation thereof.

BACKGROUND OF THE INVENTION

Coalescing agents are high boiling point solvents (that are slow to evaporate) used to reduce the minimum film formation temperature (MFFT) of paints, inks, other coating compositions and the like. In paint formulations in particular, coalescing agents act as temporary plasticizers to reduce the glass transition temperature (Tg) of the latex below that of the drying temperature to allow for good film formation.

Generally, coalescing agents function by softening the polymer particles in a latex, enabling the formation of a continuous film as the coating cures. It is desirable for the coalescing agent to have low water solubility, which increases its effectiveness, and have good hydrolytic stability.

A typical paint formulation contains between 0.1-10% coalescing agent, which is used to aid in the formation of a continuous film as the paint cures. This market has been historically dominated by Eastman's Texanol™ brand ester alcohol (2,2,4-trimethyl-1,3-pentanediol monoisobutyrate). However, Texanol is not suitable or efficient for many coalescent applications.

It is an object of the present invention to provide an improved and more efficient coalescent composition for paints and other coatings.

SUMMARY OF THE INVENTION

It is desirable to have a coalescent agent that can efficiently reduce the Tg of the system, is dispersible in the latex, is compatible with all of the other paint components (pigment, surfactant, freeze-thaw stabilizer, thickeners), has low water solubility (to increases effectiveness), good hydrolytic stability and a favorable overall balance of properties. In one aspect, the present invention is a coalescent comprising a blend of diethal esters of adipic, glutaric, and succinic diacids.

In one aspect, the present invention is a coalescent composition derived by esterifying one or more by-products in the production of polyamide, more specifically, polyamide 6,6. Generally, polyamide is a copolymer prepared by a condensation reaction formed by reacting a diamine and a dicarboxylic acid. More specifically, polyamide 6,6 is a copolymer prepared by a condensation reaction formed by reacting a diamine, typically hexamethylenediamine, with a dicarboxylic acid, typically adipic acid.

The coalescent composition can be derived from one or more by-products in the reaction, synthesis and/or production of adipic acid utilized in the production of polyamide, the coalescent composition comprising (A) a blend of ethyl, propyl, and/or isopropyl diesters of a mixture of adipic diacids, glutaric diacids, and succinic diacids ("AGS"), (B) a blend of ethyl, propyl, and/or isopropyl diesters of a mixture of adipic, methylglutaric, and ethylsuccinic diacids ("MGA"), or (C) a mixture or blend of (A) and (B).

In some embodiments the adducts have a formula:

wherein R1 and R2 are independently selected from ethyl, propyl, isopropyl, and mixtures thereof, and A is (A) a mixture of adipic, glutaric, and succinic diacids, (B) a mixture of adipic, methylglutaric, and ethylsuccinic diacids, and (C) a mixture or blend of (A) and (B).

In another aspect, the invention comprises a coating composition including but not limited to paints, coatings, inks, adhesives and the like containing the coalescent or coalescing aid composition of the present invention.

In yet another aspect, the invention comprises dried paints, coatings, and adhesives formed from such paint, coatings, inks, and adhesive compositions.

In some embodiments the coalescent agent composition comprises a blend of esters wherein about 20-28%, by weight of the blend, is a diester of the formula:

about 59-67%, by weight of the blend is a diester of the formula:

about 9-17%, by weight of the blend, is a diester of the formula:

In some embodiments about 9-11% by weight of the blend is a diester of the formula:

about 86-89% by weight of the blend is a diester of the formula:

and about 1-3%, by weight of the blend, is a diester of the formula:

DETAILED DESCRIPTION

The present invention is a coalescent composition comprising a blend of dibasic esters. The dibasic esters can be, for example, derived from one or more by-products in the production of polyamide, for example, polyamide 6,6. In one embodiment, the coalescent composition of the invention comprises a blend of ethyl, propyl, and/or isopropyl esters of a mixture of adipic diacids, glutaric diacids, and succinic diacids (AGS). In another embodiment, the coalescent composition of the invention comprises a blend of esters of adipic diacids, methylglutaric diacids, and ethylsuccinic diacids (MGA).

According to one embodiment of the present invention, the blend of dibasic esters corresponds to one or more by-products in the preparation of adipic acid or hexamethylenediamine, which are monomers utilized in the manufacture of polyamides. For example, the esters are obtained by esterification of one of the by-products, which generally contains, on a weight basis of the blend, from about 15% to about 33% succinic acid, from about 50% to about 75% glutaric acid and from about 5% to about 30% adipic acid. As another example, the dialkyl esters are obtained by esterification of another by-product, which generally contains, on a weight basis, from about 30% to 95% methyl glutaric acid, from about 5% to 20% ethyl succinic acid and from about 1% to about 10% adipic acid.

The boiling point of the blend of the present invention is typically between the range of about 150° C. to 320° C., more typically between the range of about 200° C. to 300° C., and most typically between the range of about 215° C. to 280° C.

In certain more specific embodiments, the blend comprises:

a diester of formula I:

a diester of formula II:

and a diester of formula III:

In such embodiments, the blend typically comprises (by weight of the blend) (i) about 15% to about 35% of the diester of formula I, (ii) about 55% to about 70% of the diester of formula II, and (iii) about 7% to about 20% of the diester of formula III, and more typically, (i) about 20% to about 28% of the diester of formula I, (ii) about 59% to about 67% of the diester of formula II, and (iii) about 9% to about 17% of the diester of formula Ill.

In certain other embodiments, the blend comprises:

a diester of the formula IV:

(IV)

a diester of the formula V:

(V) and a diester of the formula VI:

(VI)

In such embodiments, the blend typically comprises (by weight of the blend) (i) from about 5% to about 30% of the diester of formula IV, (ii) from about 70% to about 95% of the diester of formula V, and (iii) from about 0% to about 10% of the diester of formula VI.

More typically, blend typically comprises (by weight of the blend): (i) from about 8% to about 18% of the diester of formula IV, (ii) from about 80% to about 92% of the diester of formula V, and (iii) from about 0.5% to about 6% of the diester of formula VI.

Most typically, the blend comprises (by weight of the blend): (i) about 13% of the diester of formula IV, (ii) about 84% of the diester of formula V, and (iii) about 3% of the diester of formula VI.

It is understood that when describing one or more compositions of the present invention, it can denote a mixture of several compounds made up from a general formula as described herein. A composition can be defined by mentioning all or part of each of the precise chemical formulae of compounds present therein or by mentioning all or part of several general chemical formulae grouping together several compounds (families of compounds), if appropriate using means, or by mentioning a single general formula with means. A composition can comprises at least 50% by weight of compounds corresponding to the chemical formulae (precise formulae, or general formula (e), or mean formula (e)) used to define them, typically at least 75%, more typically at least 90%, and most typically at least 99%.

The compounds or material compositions can, for example, be obtained by a process comprising an "esterification" stage by reaction of a diacid of formula HOOC-A-COOH or of a diester of formula MeOOC-A-COOMe or of an acyl dichloride of formula ClOC-A-COCl or of an imide.

The reactions can be appropriately catalyzed. In one embodiment, use is made of at least 2 molar equivalents of alcohols per diacid, diester, acyl dichloride or imide. It is possible, for example, to employ from 2 to 2.5 equivalents for the reactions with the diacids, diesters or acyl dichlorides. It is possible, for example, to employ from 5 to 25, for example from 10 to 20, equivalents for the reactions with the imides. The reactions can, if appropriate, be promoted by extraction of the reaction by-products (for example, extraction by evaporation of the methanol during a transesterification starting from the diester).

The reaction can be followed by stages of filtration and/or of purification, for example by distillation.

Diacids or mixtures of diacids have been described above (by the group A) and are commercially available. Use may in particular be made of a mixture of dibasic esters of adipic acid, glutaric acid and succinic acid, sometimes referred to as "AGS". Use may in particular be made of a mixture of dibasic esters of adipic acid, methylglutaric acid and ethylsuccinic acid, sometimes referred to as "MGA". A mixture of light diesters, such as a mixture of dimethyl adipate, dimethyl glutarate and dimethyl succinate, can be employed for the transesterification reaction.

According to another embodiment, use is made, as reactant, of 2-methylglutaric acid, or of a mixture of 2-ethylsuccinic acid and 2-methylglutaric acid, or of a mixture of 2-ethylsuccinic acid, 2-methylglutaric acid and adipic acid, or of the corresponding diesters.

The latex film forming compositions can be any of the type which benefit from coalescing agents, especially compositions where low VOC is an advantage or necessary and/or efficiency is an advantage. The coatings of the present invention are suitable for use in a variety of architectural and industrial applications, more typically architectural applications, including but not limited to automotive and aerospace paints (e.g., clear coatings or undercoats, floor covering coatings, wall coatings, transportation coatings, maintenance coatings, and the like) or any other application where a low VOC coating composition is desired for use on a substrate.

It is understood that other additives such can be added to the coating composition including but not limited to one or more thickeners, dispersants, defoamers, surfactants, emulsifiers, rheology modifiers, wet-edge additives, whetting agents, humectants, wax, colorants, UV absorbers, pigments, freeze-thaw stabilizers, biocides, anti-oxidants, volatile plasticizers and the like, or a combination thereof.

The compositions of the present invention can be used as components of other compositions such as paint compositions. In one embodiment, the composition of the present invention is applied to various substrates, for example, wood or wooden surfaces, plastic surfaces, metal surfaces, primed or painted surfaces, and stone or cement substrates, using conventional methods including but not limited to spraying, brushing, rolling and the like.

The following examples in which all parts and percentages are by weight unless otherwise indicated are presented to illustrate a few embodiments of the invention.

The primary characteristic of a coalescing agent is the efficiency in which it enables a consistent film to form and this was determined by measuring the MFFT on a MFFT Bar 90. A coalescing agent having a minimum 50% reduction of VOC as analyzed via EPA Method 24 is desired to be developed. Finally, regardless of the product's efficiency or VOC, it is desirable that any additive formulated into a coating have minimal/no effect on the appearance of the film, as determined semi-quantitatively by drawing a film on glass and visually inspecting the surface for defects.

EXAMPLES

Example 1

Paint Formulations for AGS Diesters

Figure 2:
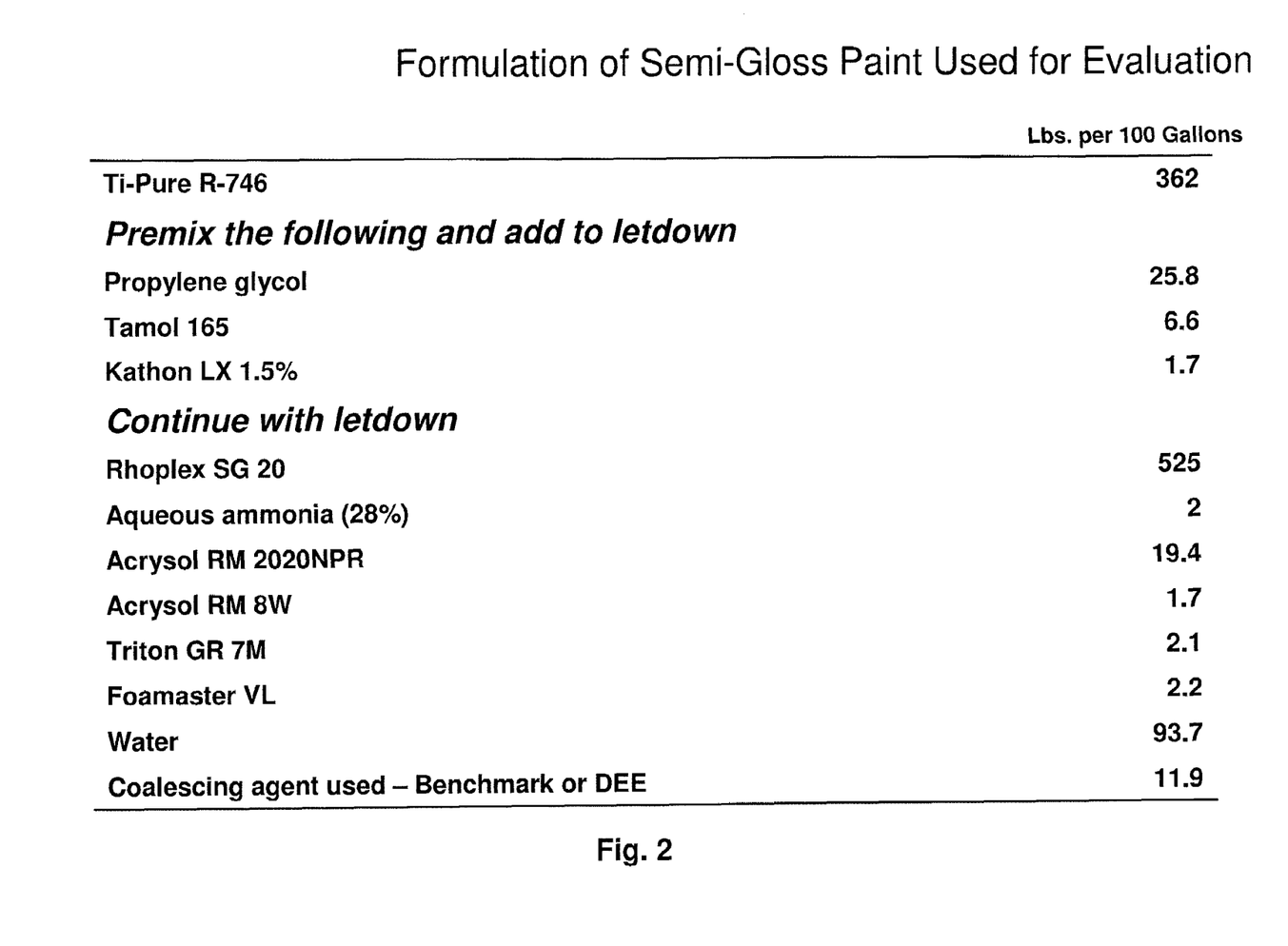
FIG. 2 is a formulation of semi-gloss paint used for the experiments described in the examples.

The coalescent diesters of the invention and a benchmark (Texanol) were formulated into a semi-gloss paint formulation as set forth in FIG. 2.

Figure 1:
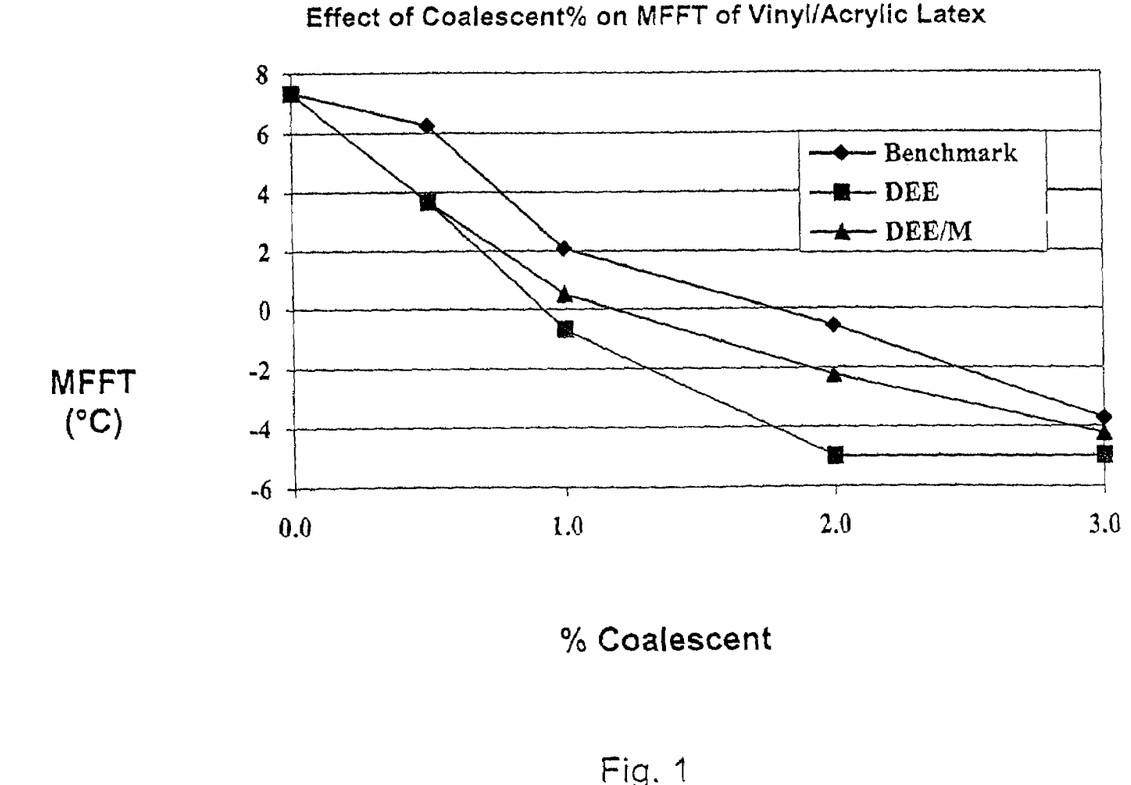
FIG. 1 is a graph of comparative experimental data showing the effect of DEE and DEE/M coalescents on minimum film forming temperature (MFFT) of a vinyl/acrylic latex versus a benchmark (Texanol).

Referring now to FIG. 1, the effect of one embodiment of the coalescent agent, DEE (by weight percent) on MFFT is shown graphically. The minimum film formation temperature (MFFT) is used as a key test to measure efficiency of coalescence and reflects the ability of paint to be applied in cold weather, wherein a lower MFFT allows for a paint to be applied at lower temperatures while still maintaining acceptable coalescence properties. FIG. 1 shows the DEE coalescing agent versus the benchmark Texanol™ coalescing agent, both used in connection with vinyl/acrylic latex paint. It shows that DEE is more efficient as a coalescing agent as compared to the benchmark, lowering the MFFT by about 30% (percent). The semi-gloss paint used for evaluation purposes comprises various components, as shown in FIG. 2

Figure 3:
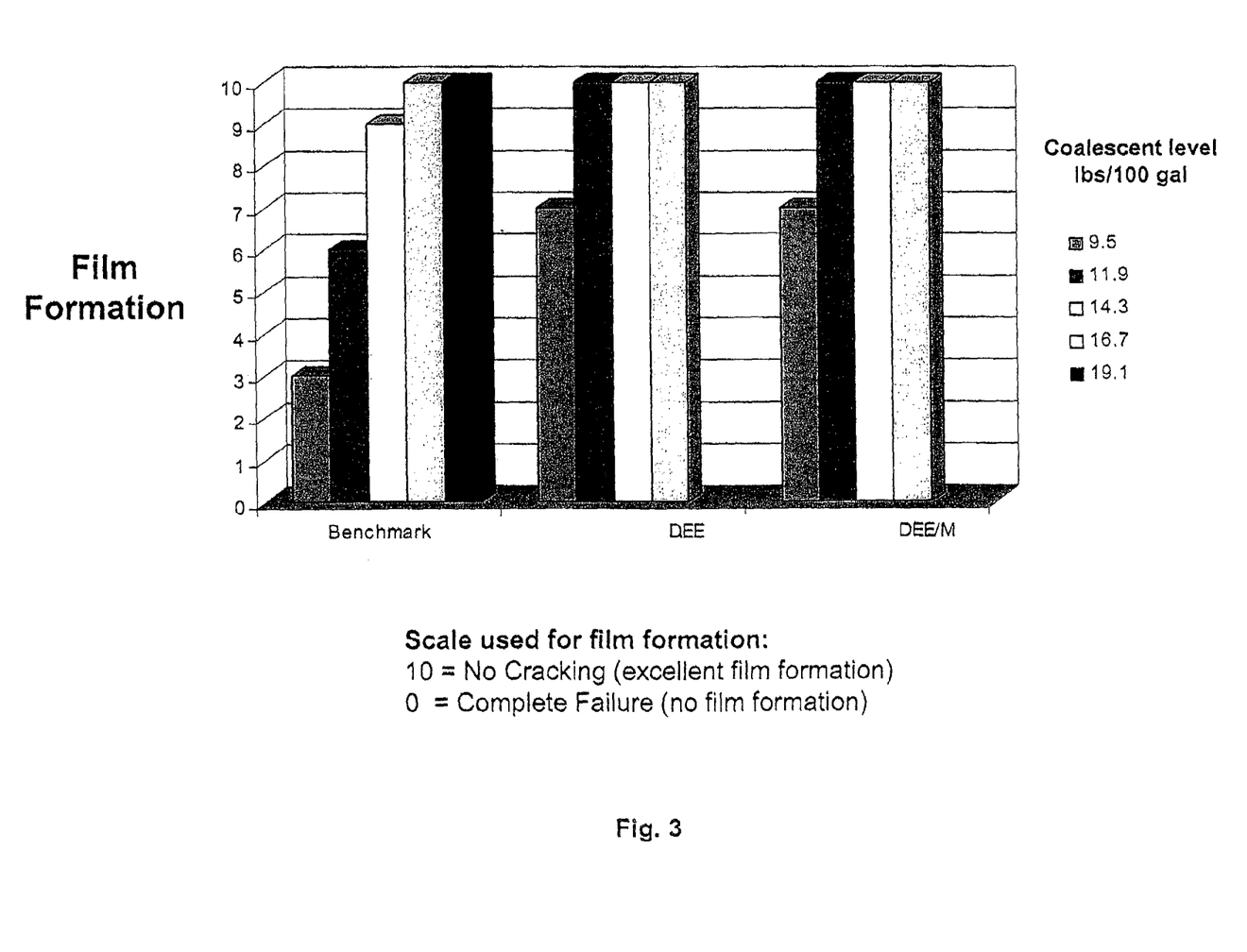
FIG. 3 is a graph illustrating the effect of varying concentrations of DEE of the present invention versus the benchmark (Texanol) on film formation at varying levels of DEE and DEE/M, with film formation scale varying from 0 up to 10, 10 indicating no cracking and 0 indicating complete failure.

Referring to FIG. 3, the performance for film formation with respect to different coalescing agent levels, comparing DEE with the benchmark, is illustrated graphically. The chart shows that DEE is more efficient than the benchmark, Texanol™, by about 30%. This means that a lower level or amount of DEE is required to obtain the same film formation as that of the benchmark.

Figure 4:
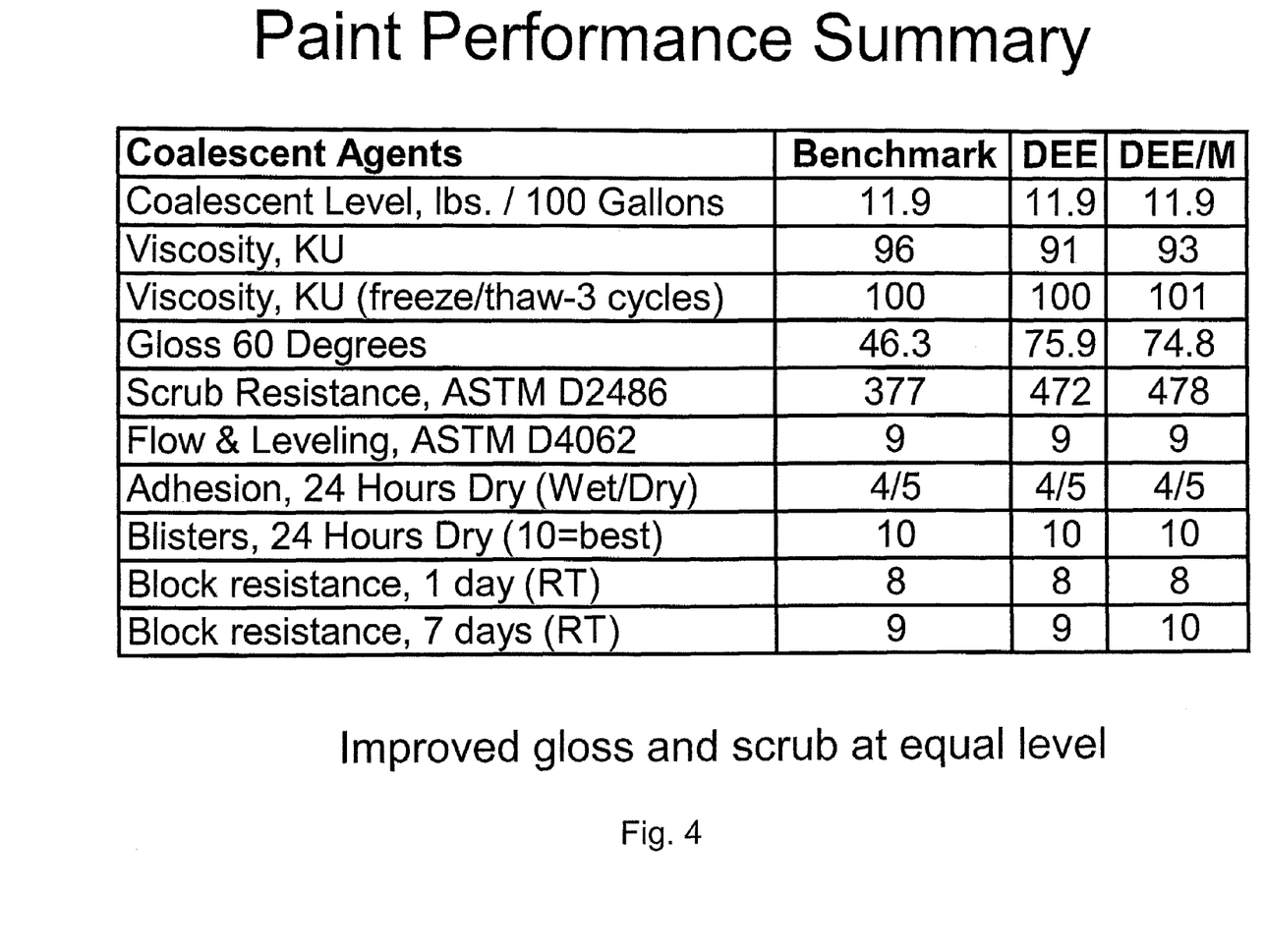
FIG. 4 is a table of data comparing paint performance with DEE and DEE/M of the present invention versus the benchmark (Texanol), demonstrating improved gloss and scrub at equal levels of coalescent.

The paint performance summary is set forth in FIG. 4, which shows improved gloss and scrub resistance at equal levels for DEE as compared with the benchmark.

Figure 5:
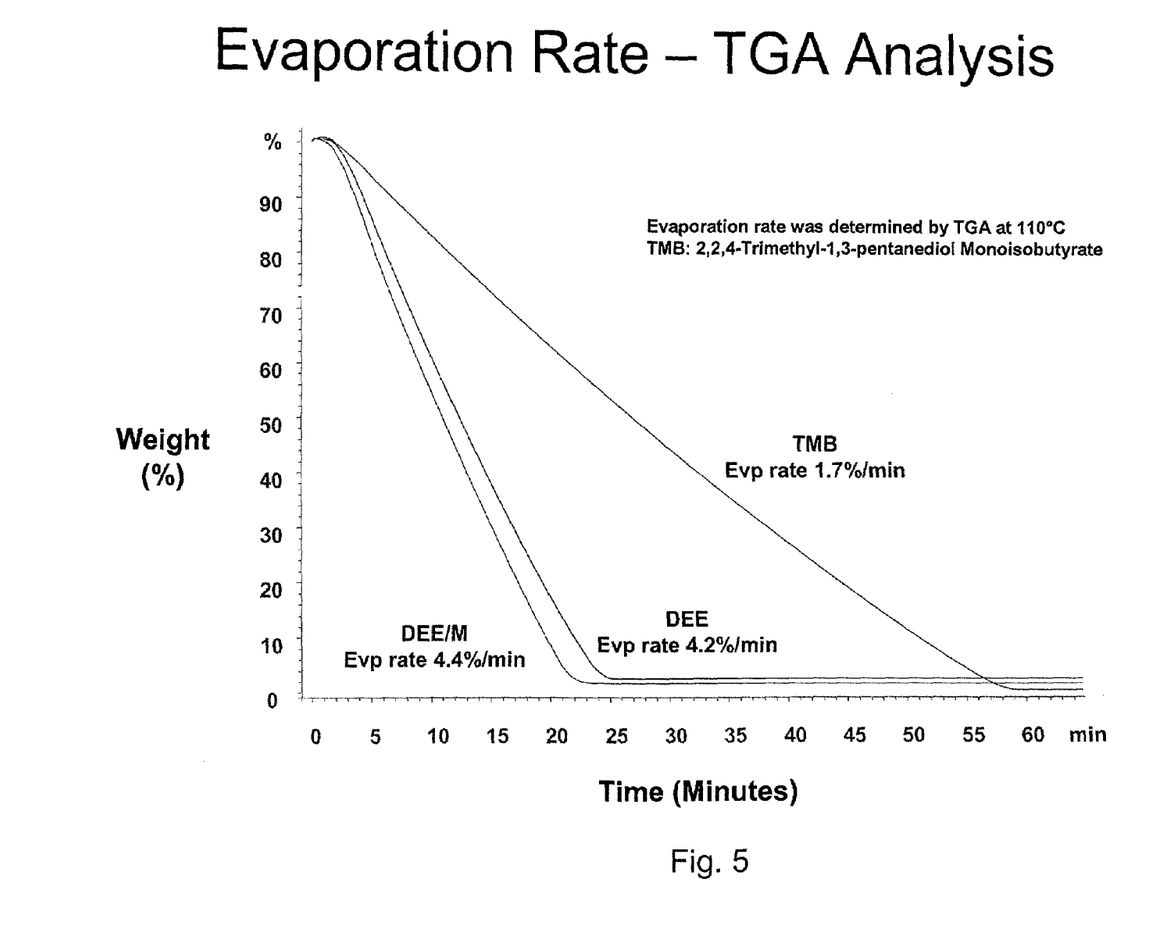
FIG. 5 is a graph comparing the evaporation rate of DEE over time versus the benchmark (Texanol), wherein DEE and DEE/M evaporated at a more favorable rate, 4.2%/minute versus 1.7%/minute for the benchmark (Texanol).

Referring now to FIG. 5, evaporation rate by TGA analysis is shown for an experiment comparing DEE with the Texanol benchmark. The evaporation rate was determined by TGA at 11° C. As shown, the evaporation rate DEE is greater (i.e., evaporates faster) as compared with Texanol™, where film properties such as hardness recovered much faster than the benchmark.

Figure 6:
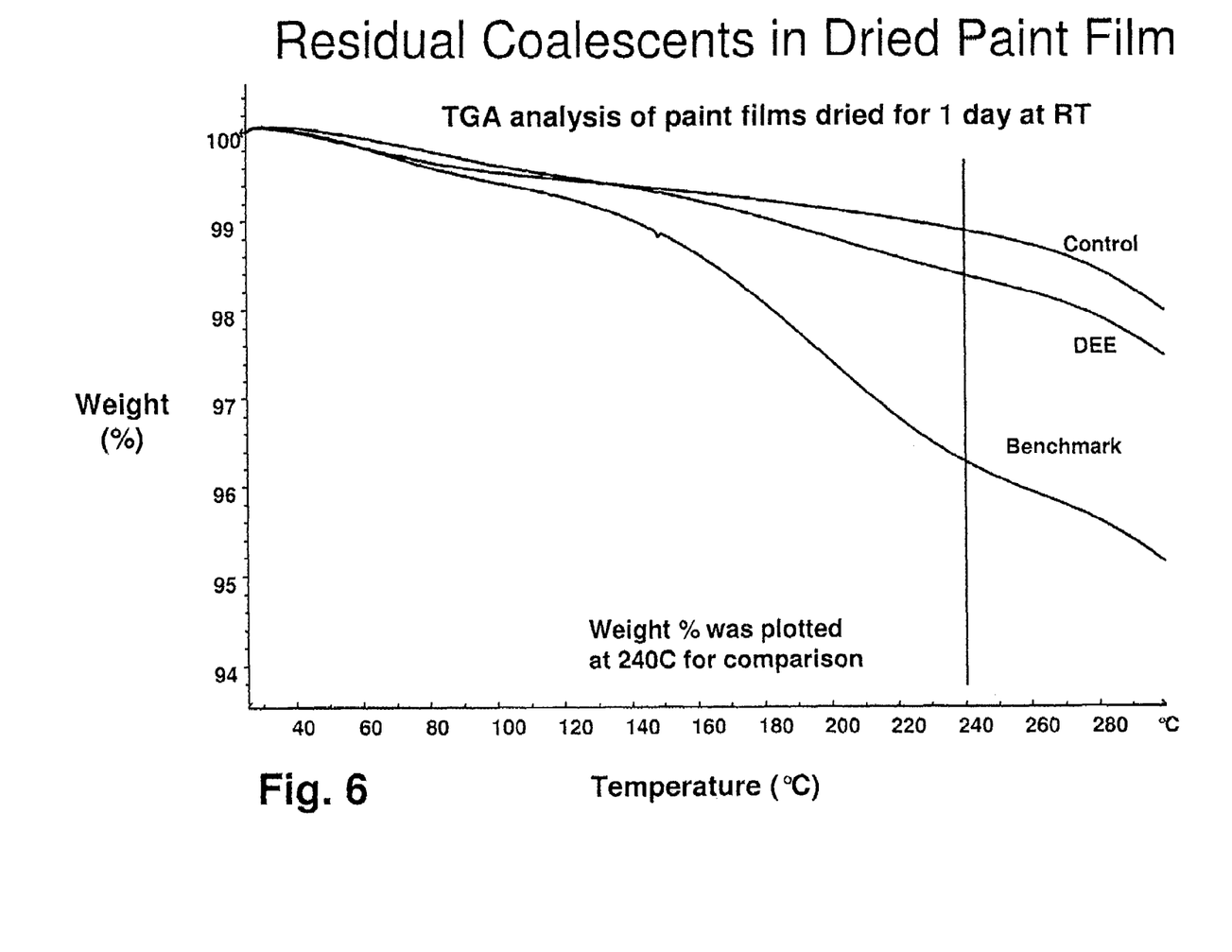
FIG. 6 is a graph comparing residual coalescent for DEE of the invention versus a control (no coalescent) and the benchmark (Texanol).

Referring to FIG. 6 residual coalescent agents in dried paint film using TGA Analysis shows DEE coalescent was improved over the benchmark.

Figure 7:
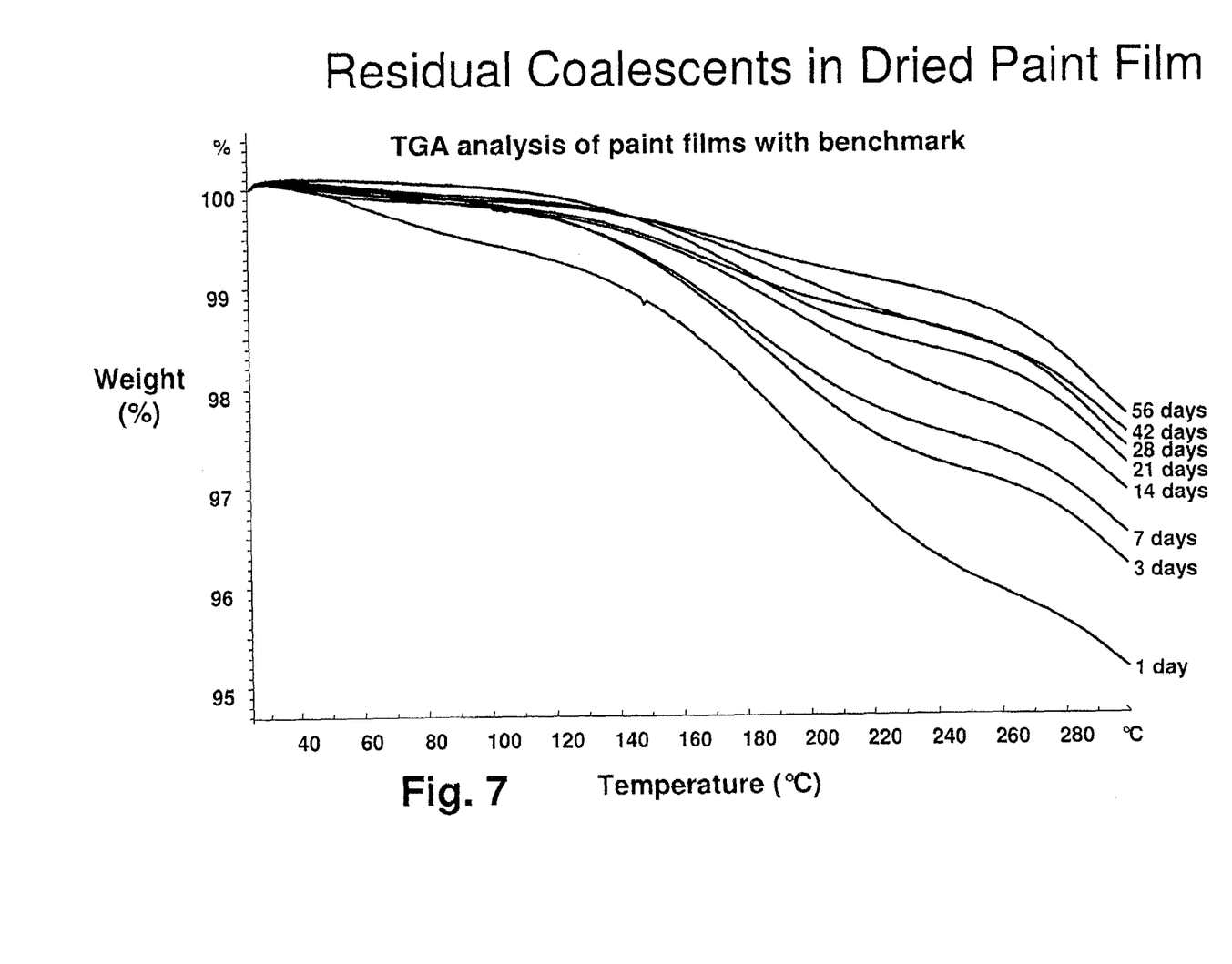
FIG. 7 is a graph of residual benchmark coalescent (Texanol) in dried paint film at varying temperatures for a selection of time periods from 1 day to 56 days.

FIG. 7 is a graph of residual Texanol benchmark which shows there was still some residual even after about 56 days. Other data not illustrated in the drawings demonstrated residual Texanol even after 12 weeks.

Figure 8:
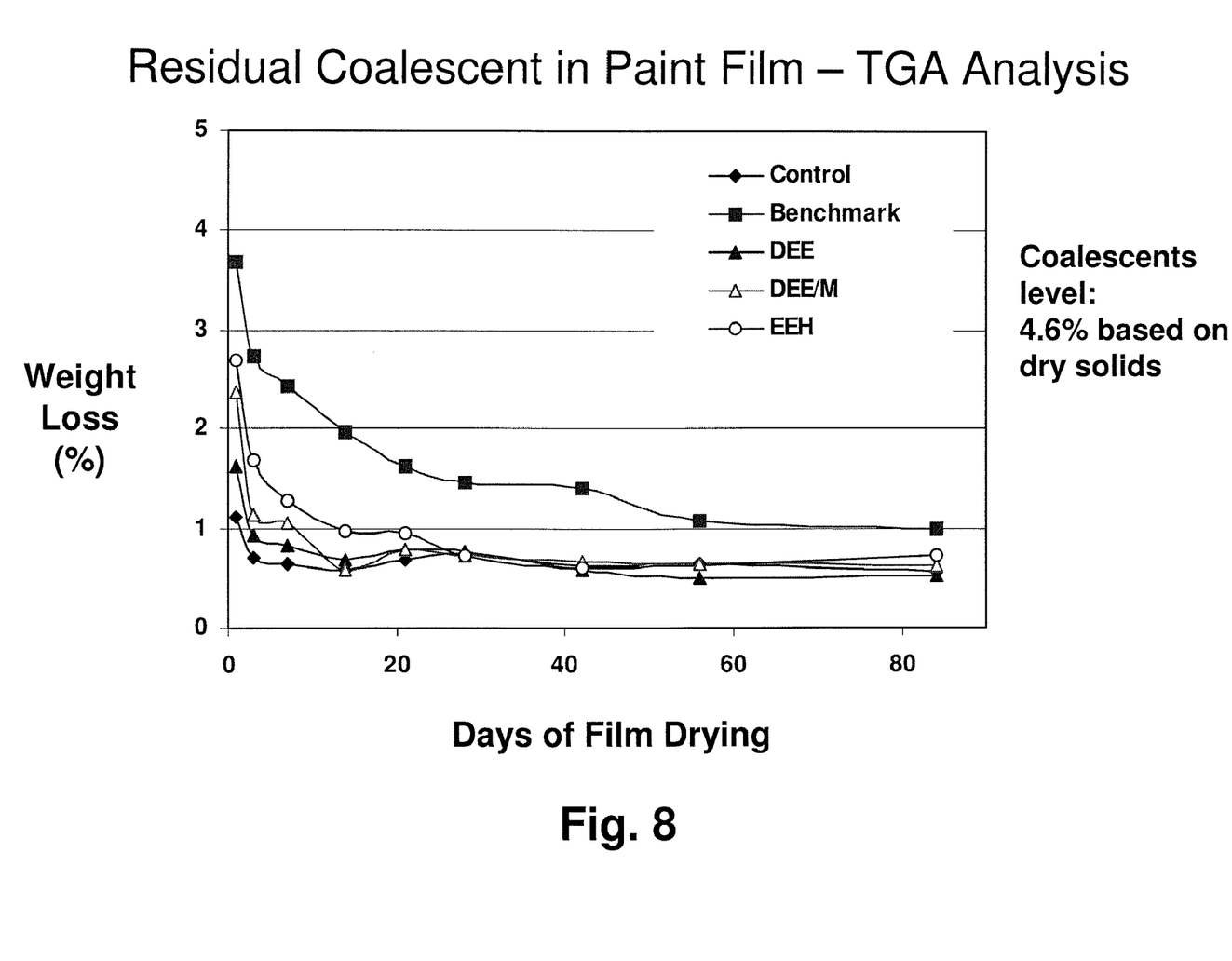
FIG. 8 is a graph comparing residual coalescent in paint film for DEE and DEE/M, representing the invention, versus a control (no coalescent), benchmark (Texanol), and EEH, using TGA analysis.

FIG. 8 is a graph comparing DEE, DEE/M (the diethyl ester of MGA diacids, the control with no coalescent, Texanol benchmark, and EEH (Ethylene Glycol 2-Ethylhexyl Ether), which is similar to Texanol) by DSC Analysis.

Figure 9:
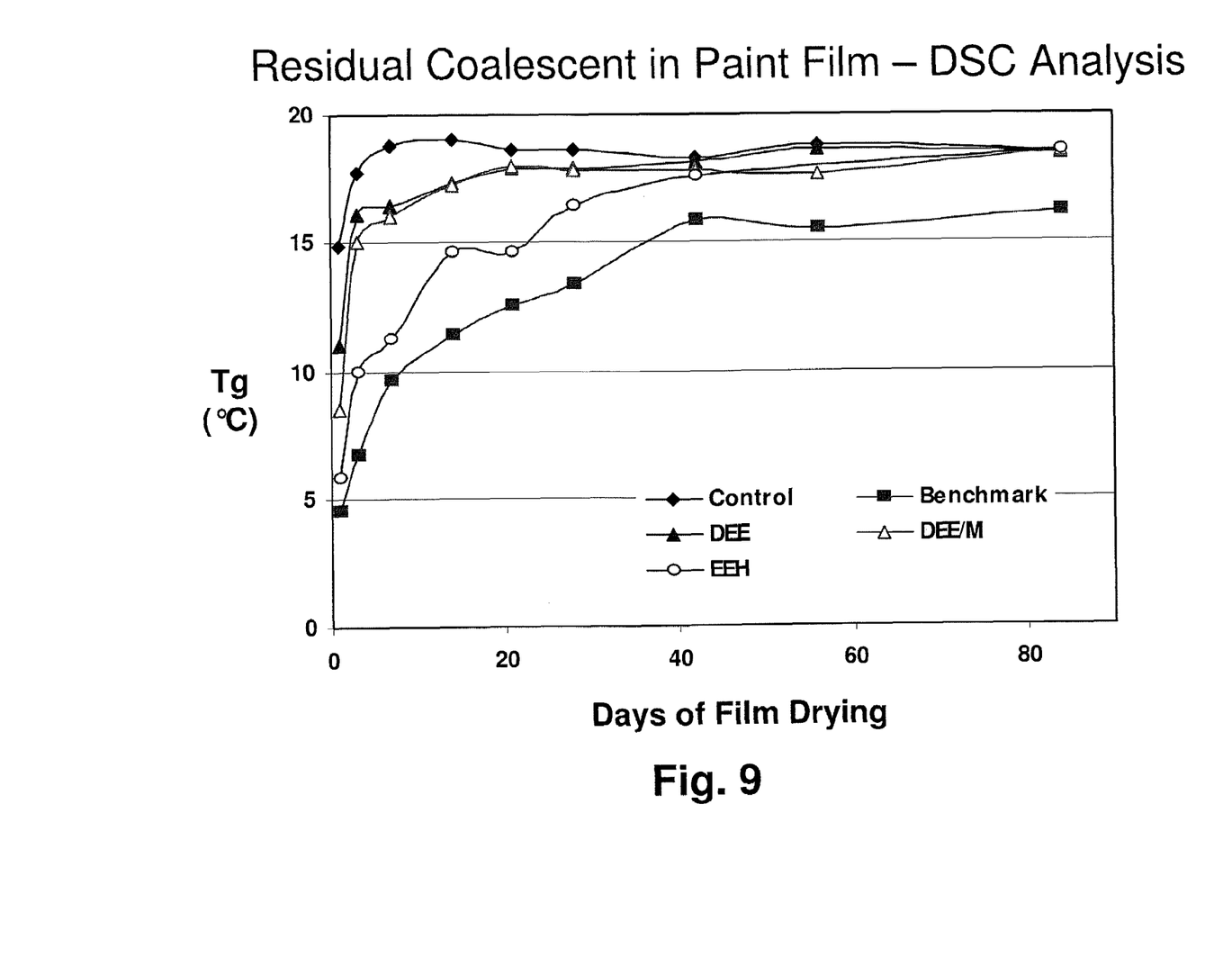
FIG. 9 is a graph comparing residual coalescent in paint film for DEE and DEE/M, representing the invention, versus a control (no coalescent), benchmark (Texanol), and EEH, using DSC analysis.

FIG. 9 is a graph showing results of experiments comparing DEE and DEE/M of the invention to control, EEH, and Texanol benchmark using DSC analysis.

Figure 10:
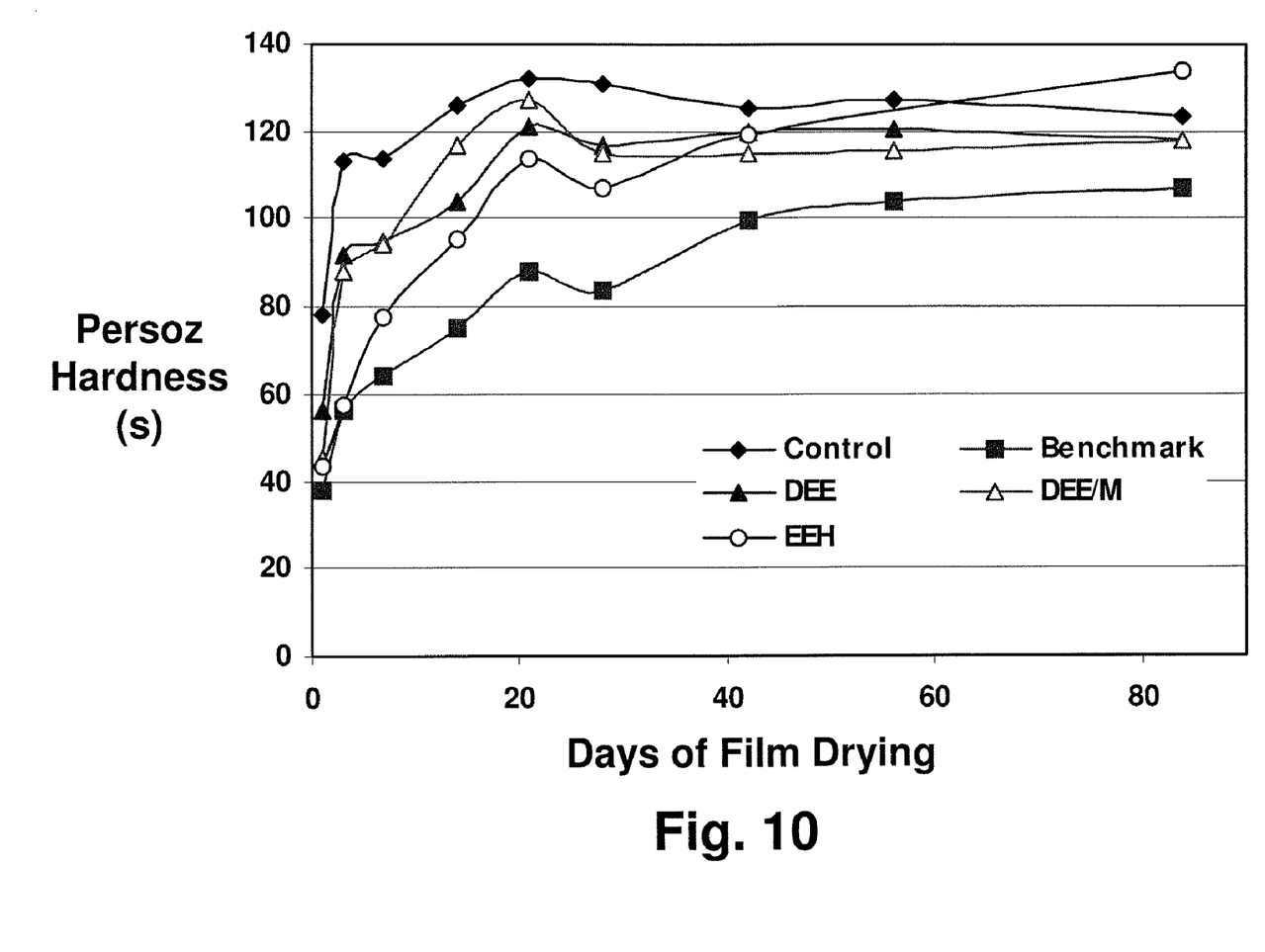
FIG. 10 is a graph comparing hardness over a period up to 85 days for DEE and DEE/M of the invention with EEH (Ethylene Glycol 2-Ethylhexyl Ether), a control (no coalescent), and the benchmark (Texanol).

Referring to FIG. 10, Persoz hardness (Y axis) was measured as a function of days of film drying (X-axis). Hardness of the paint film developed at a faster rate with added DEE and DEE/M as compared with the benchmark, Texanol™. Accordingly, lower levels of the coalescing agents of the present invention are needed as compared with the benchmark to achieve similar performance in paint formulations. In addition, the coalescing agents of the present invention are useful in achieving a lower MFFT compared with the benchmark in formulated paints.

The present invention, therefore, is well adapted to carry out the objects and attain the ends and advantages mentioned, as well as others inherent therein. While the invention has been depicted and described and is defined by reference to particular embodiments of the invention, such references do not imply a limitation on the invention, and no such limitation is to be inferred. The invention is capable of considerable modification, alteration and equivalents in form and function, as will occur to those ordinarily skilled in the pertinent arts. The depicted and described embodiments of the invention are exemplary only and are not exhaustive of the scope of the invention. Consequently, the invention is intended to be limited only by the spirit and scope of the appended claims, giving full cognizance to equivalents in all respects.

What is claimed is:

1. A coalescent agent composition comprising a blend of diesters, the blend comprising adducts of alcohol and diacids, the alcohol selected from the group consisting of ethyl, propyl, isopropyl alcohol and mixtures thereof, and the diacids selected from a blend of adipic, methylglutaric, and ethylsuccinic diacids ("MGA"),the blend comprising:

about 8-18%, by weight of the blend, a diester of the formula

About 80-92%, by weight of the blend, a diester of the formula:

about 0.5-6%, by weight of the blend, a diester of the formula:

2. Paints, adhesives, inks, and coating compositions comprising the composition of claim 1.

* * * * *